(12) United States Patent
Nakanishi

(10) Patent No.: US 7,834,804 B2
(45) Date of Patent: Nov. 16, 2010

(54) RADAR APPARATUS

(75) Inventor: Motoi Nakanishi, Nagaokakyo (JP)

(73) Assignee: Murata Manufacturing Co., Ltd., Nagaokakyo-shi, Kyoto-fu (JP)

( * ) Notice: Subject to any disclaimer, the term of this patent is extended or adjusted under 35 U.S.C. 154(b) by 0 days.

(21) Appl. No.: 12/469,928

(22) Filed: May 21, 2009

(65) Prior Publication Data

US 2009/0224963 A1    Sep. 10, 2009

Related U.S. Application Data

(63) Continuation of application No. PCT/JP2007/073049, filed on Nov. 29, 2007.

(30) Foreign Application Priority Data

Nov. 30, 2006    (JP) .............................. 2006-322980

(51) Int. Cl.
*G01S 13/34* (2006.01)
*G01S 7/40* (2006.01)
(52) U.S. Cl. .................... 342/128; 342/70; 342/200
(58) Field of Classification Search .................. 342/70, 342/87, 102, 128, 145, 200
See application file for complete search history.

(56) References Cited

U.S. PATENT DOCUMENTS

| 4,107,679 A | 8/1978 | Strauch et al. |
| 5,187,484 A | 2/1993 | Stove |
| 6,597,308 B2 * | 7/2003 | Isaji ............................ 342/70 |
| 7,164,382 B2 * | 1/2007 | Kai ............................. 342/70 |

FOREIGN PATENT DOCUMENTS

| JP | 52-129458 | 10/1977 |
| JP | 5-66269 | 3/1993 |
| JP | 8-304532 | 11/1996 |
| JP | 11-231045 | 8/1999 |
| JP | 11-271428 | 10/1999 |
| JP | 2001-174548 | 6/2001 |
| JP | 2002-62355 | 2/2002 |
| JP | 2004-166076 | 6/2004 |

OTHER PUBLICATIONS

PCT/JP2007/073049 International Search Report dated Jan. 4, 2008.
PCT/JP2007/073049 Written Opinion dated Jan. 4, 2008.

* cited by examiner

*Primary Examiner*—Ian J Lobo
(74) *Attorney, Agent, or Firm*—Dickstein Shapiro LLP

(57) ABSTRACT

A beat signal normalizing section in a correction control section normalizes a group of sampling data of an input beat signal in one processing group. A phase amount measuring section calculates an amount of phase change of each sampling data. A correction control value calculating section compares the actually measured amount of phase change of each sampling data with an ideal amount of phase change of each sampling data and generates correction voltage data such that the actually measured amount of phase change matches with the ideal amount of phase change. Correction control data provided as the correction voltage data at each sampling time is applied to a transmission control section. The transmission control section generates transmission control data based on the correction control data and applies the transmission control data to a VCO through a DAC.

5 Claims, 12 Drawing Sheets

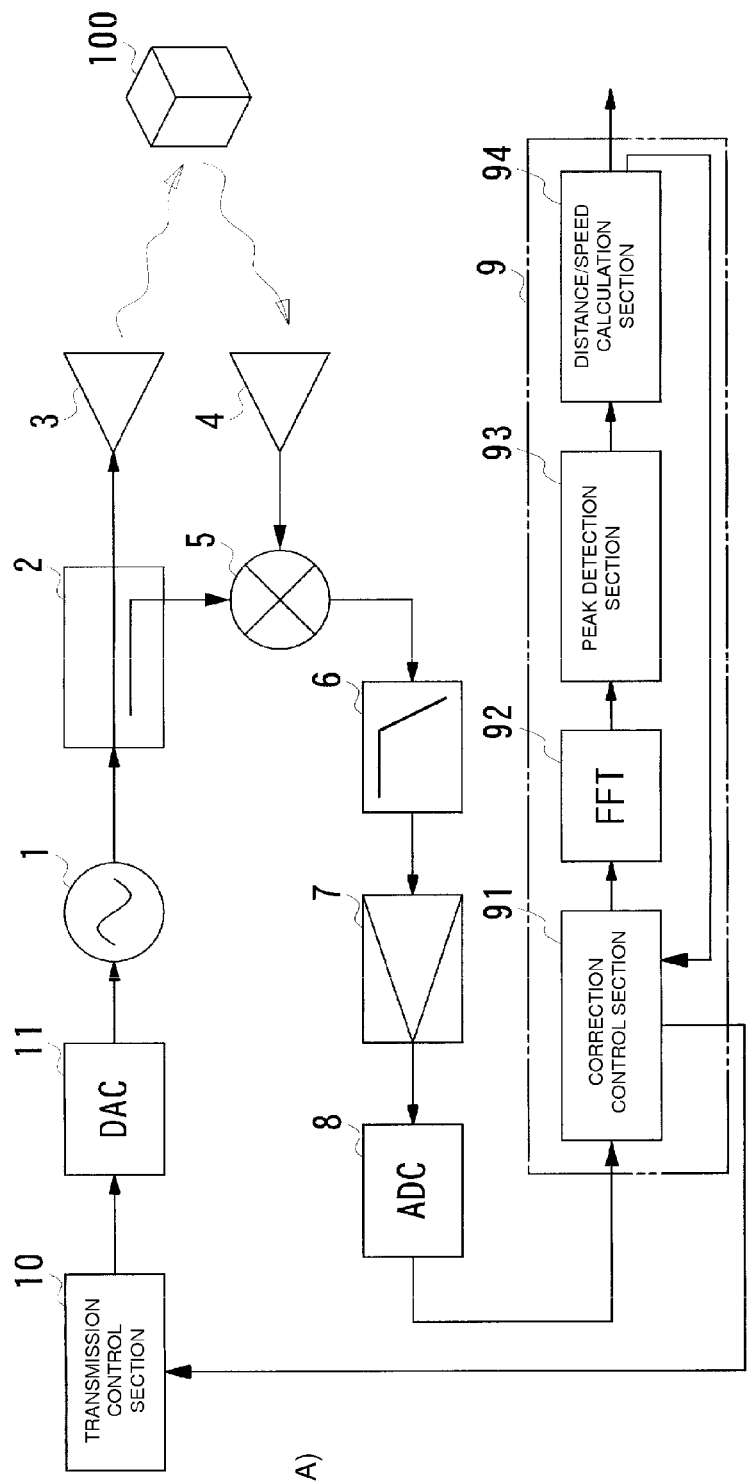
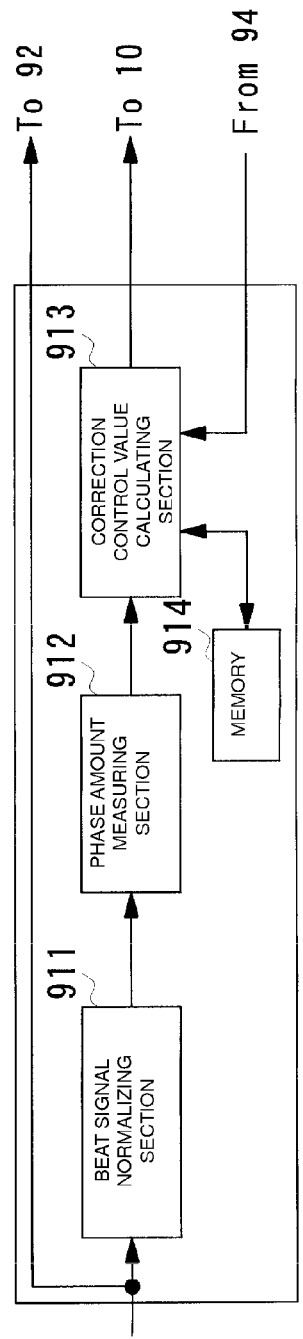
FIG. 11(A)
FIG. 11(B)

RADAR APPARATUS

CROSS REFERENCE TO RELATED APPLICATIONS

The present application is a continuation of International Application No. PCT/JP2007/073049, filed Nov. 29, 2007, which claims priority to Japanese Patent Application No. JP2006-322980, filed Dec. 11, 2006, the entire contents of each of these applications being incorporated herein by reference in their entirety.

FIELD OF THE INVENTION

The present invention relates to a radar apparatus for transmitting electric waves to a detection area and detecting a target (object) based on waves reflected by the target upon impingement of the transmitted waves against the target, and more particularly to a radar apparatus in which a frequency of the transmitted waves is changed over time within a predetermined frequency range.

BACKGROUND OF THE INVENTION

Hitherto, various radar apparatuses have been proposed which are disposed, for example, in front portions of automobiles, and which transmit transmission waves to a predetermined detection area including a region in front of the automobile, and receives waves reflected by a target in the detection area, to thereby detect the target. As one example of such radar apparatuses, the FMCW type is widely employed in the field of automobiles.

The FMCW-type radar apparatus employs a transmission signal having a frequency changing in the form of, e.g., a triangular wave, which alternately includes an up-modulation zone where the frequency of the transmission signal gradually increases, and a down-modulation zone where the frequency of the transmission signal gradually decreases. That type of radar apparatus includes a voltage control oscillator. The frequency of the transmission signal is modulated by varying the frequency of a signal output from the voltage control oscillator. Therefore, an accurate modulated signal in the triangular-wave form can be transmitted by accurately applying a voltage that controls the voltage control oscillator.

To overcome such a problem, in an apparatus described in Patent Document 1, a transmission signal is divided in a predetermined number of division points and a voltage applied to a voltage control oscillator is sequentially corrected and set at each of the division points such that a distance measured at each of the division points matches with a preset desired distance.

Further, in an apparatus described in Patent Document 2, a frequency modulation zone is time-divided into a plurality of short zones, and an FFT process is executed for each of the divided short zones. Then, a voltage applied to a voltage control oscillator is corrected and set by comparing respective frequency spectra of beat signals obtained in the divided short zones and controlling the voltage such that the frequency spectra match with each other.

Patent Document 1: Japanese Unexamined Patent Application Publication No. 8-304532

Patent Document 2: Japanese Unexamined Patent Application Publication No. 11-271428

With the apparatus described in Patent Document 1, however, unless the distance measured at each of the division points is accurate, it is difficult to accurately perform the correction. Obtaining the accurate measured distance requires the measurement and the correction to be repeated in a considerable number of times.

With the apparatus described in Patent Document 2, because the FFT process has to be executed for each of the divided short zones, a processing load is increased. In addition, because the FFT process executed in the short zone on the time basis deteriorates frequency resolution, the measurement and the correction cannot be accurately performed.

SUMMARY OF THE INVENTION

Accordingly, an object of the present invention is to provide a radar apparatus in which a voltage correction amount can be calculated with simple processing and high accuracy.

The present invention relates to a radar apparatus comprising transmitting means for changing a frequency over time in a predetermined frequency band width to generate a transmission signal and transmitting the transmission signal; receiving means for receiving a reflected signal resulting from the transmission signal and generating a reception signal; and target detecting means for detecting a target based on a beat signal obtained from the reception signal and the transmission signal. The radar apparatus further comprises beat signal normalizing means for holding an amplitude of the beat signal constant and removing an offset component; actually-measured phase change amount calculating means for calculating an actually measured amount of phase change of the normalized beat signal per unit time; and correction control value calculating means for calculating a correction control value per unit time, which makes the actually measured amount of phase change matched with a preset amount of phase change per unit time. The transmitting means of the radar apparatus generates the transmission signal while correcting the transmission signal based on the correction control value.

With such a configuration, the transmitting means generates and transmits a transmission signal, for example, including an up-modulation zone and a down-modulation zone and having a frequency that is changed in the form of a triangular wave over those zones. The receiving means receives a reflected signal resulting from reflection of the transmission signal by a target and generates a reception signal. The beat signal normalizing means holds the amplitude of the beat signal constant, which is obtained from both the transmission signal and the reception signal, and also removes an offset component, thus generating a normalized beat signal reformed to have a particular amplitude. The actually-measured phase change amount calculating means calculates an actually measured amount of phase change of the normalized beat signal per unit time by dividing a total amount of phase change of the normalized beat signal by the number of unit times, i.e., the number of unit sampling timings. The correction control value calculating means calculates a correction control value per unit time such that the actually measured amount of phase change, which has been calculated per unit time, is matched with a preset amount of phase change per unit time. The thus-calculated correction control value is fed back to the transmitting means, and the transmitting means generates the transmission signal based on the fed-back correction control value.

Also, in the radar apparatus according to the present invention, the beat signal normalizing means is replaced with quadrature detecting means which generates a first beat signal and a second beat signal having a phase difference of $\pi/2$ therebetween from the transmission signal and the reception signal, and which executes quadrature detection based on the first beat signal and the second beat signal, thereby calculating the actually measured amount of phase change in advance.

Such a configuration is based on the fact that a signal phase can be directly obtained by executing the quadrature detection with use of signals having a phase difference of $\pi/2$ therebetween. In more detail, when a first beat signal and a second beat signal having a phase delay of π/2 from the former are generated from a pair of the transmission signal and the reception signal such that the first beat signal is provided by a real part Rbeat and the second beat signal is provided by an imaginary part Ibeat, the phase of the beat signal is calculated from the following formula:

arctan(Ibeat/Ibeat)

Stated another way, by calculating an arctan function of a value resulting from dividing a level of the first beat signal by a level of the second beat signal, the actually measured amount of phase change can be calculated without using the beat signal normalizing means.

Further, in the radar apparatus according to the present invention, the actually-measured phase change amount calculating means uses an average value of the actually-measured phase change amounts, which are obtained from plural lots of beat signals resulting from reflection of the transmission signal by the target at a particular unit distance.

With such a configuration, an error element included in each measurement is suppressed by executing an average value calculating process on the actually measured amounts of phase changes, which are obtained from the plural lots of beat signals.

Still further, in the radar apparatus according to the present invention, the actually-measured phase change amount calculating means comprises peak spectrum detecting means for executing a Fourier transform process on the beat signal and detecting a peak spectrum; and partial beat signal obtaining means for executing an inverse transform process on spectrum data within a predetermined frequency range including the detected peak spectrum and obtaining a beat signal component corresponding to the predetermined frequency range, the actually measured amount of phase change being calculated based on the obtained beat signal component.

With such a configuration, the peak spectrum detecting means detects a peak spectrum. The partial beat signal obtaining means executes an inverse transform process on spectrum data within a predetermined frequency range including the detected peak spectrum and obtains a partial beat signal corresponding to the spectrum peak. The actually-measured phase change amount calculating means calculates a phase change amount based on the obtained beat signal component. As a result, even when there are a plurality of targets, the phase change amount is obtained for each target.

Moreover, the radar apparatus according to the present invention further comprises ideal phase change amount calculating means for calculating an ideal amount of phase change per unit time based on a total amount of phase change derived from both a distance to the target and the predetermined frequency band width. The correction control value calculating means in the radar apparatus calculates the correction control value per unit time such that the actually measured amount of phase change matches with the ideal amount of phase change.

With such a configuration, the ideal amount of phase change per unit time is calculated based on the total amount of phase change corresponding to the known distance. A difference between the ideal amount of phase change and the actually measured amount of phase change corresponds to an objective correction amount. Therefore, the correction control of the transmitting means is performed by calculating the correction control amount which makes the actually measured amount of phase change matched with the ideal amount of phase change. As a result, the phase change amount is corrected to the known accurate amount.

In addition, the radar apparatus according to the present invention further comprises normalized ideal phase-change amount calculating means for calculating a normalized ideal amount of phase change per unit time for a preset reference distance based on a total amount of phase change derived from both a distance to the target, which is detected by the target detecting means, and the predetermined frequency band width. The correction control value calculating means in the radar apparatus calculates the correction control value per unit time such that the actually measured amount of phase change matches with the normalized ideal amount of phase change.

With such a configuration, the normalized total amount of phase change for the preset reference distance is obtained from both the distance to the target, which is detected by the target detecting means, and the total amount of phase change. Then, the normalized ideal amount of phase change per unit time is obtained from the normalized total amount of phase change. The correction control value calculating means calculates the correction control amount which makes the actually measured amount of phase change matched with the normalized ideal amount of phase change, whereby the correction control of the transmitting means is performed. As a result, the transmission signal is corrected even during the actual detection of the target.

According to the present invention, the phase change amount per unit time is corrected so as to become the reference phase change amount through simple processing. Further, since the transmission signal is generated based on the correction control value obtained with such processing, the transmission signal can be transmitted in an accurate frequency modulation pattern. As a result, the distance, the speed, the position, etc. of the target can be detected with higher accuracy.

Also, according to the present invention, the correction control can be performed with the simpler configuration and processing by utilizing the quadrature detection.

Further, according to the present invention, by using an average value of plural beat signals, an influence of an error factor caused in each measurement is suppressed and the correction control can be performed with higher accuracy.

Still further, according to the present invention, the correction control value is calculated by extracting a portion of the frequency range including the spectrum peak. Therefore, even when there are a plurality of targets, the correction control value can be accurately calculated for each of the plural targets.

Still further, according to the present invention, the correction control value can be calculated with higher accuracy by using the preset distance to the target.

Still further, according to the present invention, even during actual detection of the target, the correction control value can be calculated with higher accuracy and the transmission signal can be corrected with higher accuracy by using the more accurate correction control value.

BRIEF DESCRIPTION OF DRAWINGS

FIGS. 11(A) and 11(B) are block diagrams illustrating a primary configuration of a radar apparatus according to a third embodiment.

REFERENCE NUMERALS

1—voltage control oscillator (VCO), 2, 21, 22, 23—couplers, 3—transmitting antenna, 4—receiving antenna, 5, 51, 52—mixers, 6, 61, 62—antialiasing filters, 7, 71, 72—IF amplification circuits, 8, 81, 82—AD converters, 9—signal processing section, 10—transmission control section, 11—DA converter, 25—π/2 phase shifter, 91, 95—correction control sections, 92—FFT processing section, 93—peak detecting section, 94—distance/speed calculating section, 100—target, 911—beat signal normalizing section, 912—phase amount measuring section, 913—correction control value calculating section, 914—memory, 915—inverse FFT processing section, 951—quadrature detector, 953—correction control value calculating section, and 954—memory.

DETAILED DESCRIPTION OF THE INVENTION

A radar apparatus according to a first embodiment of the present invention will be described with reference to the drawings.

Figure 1:
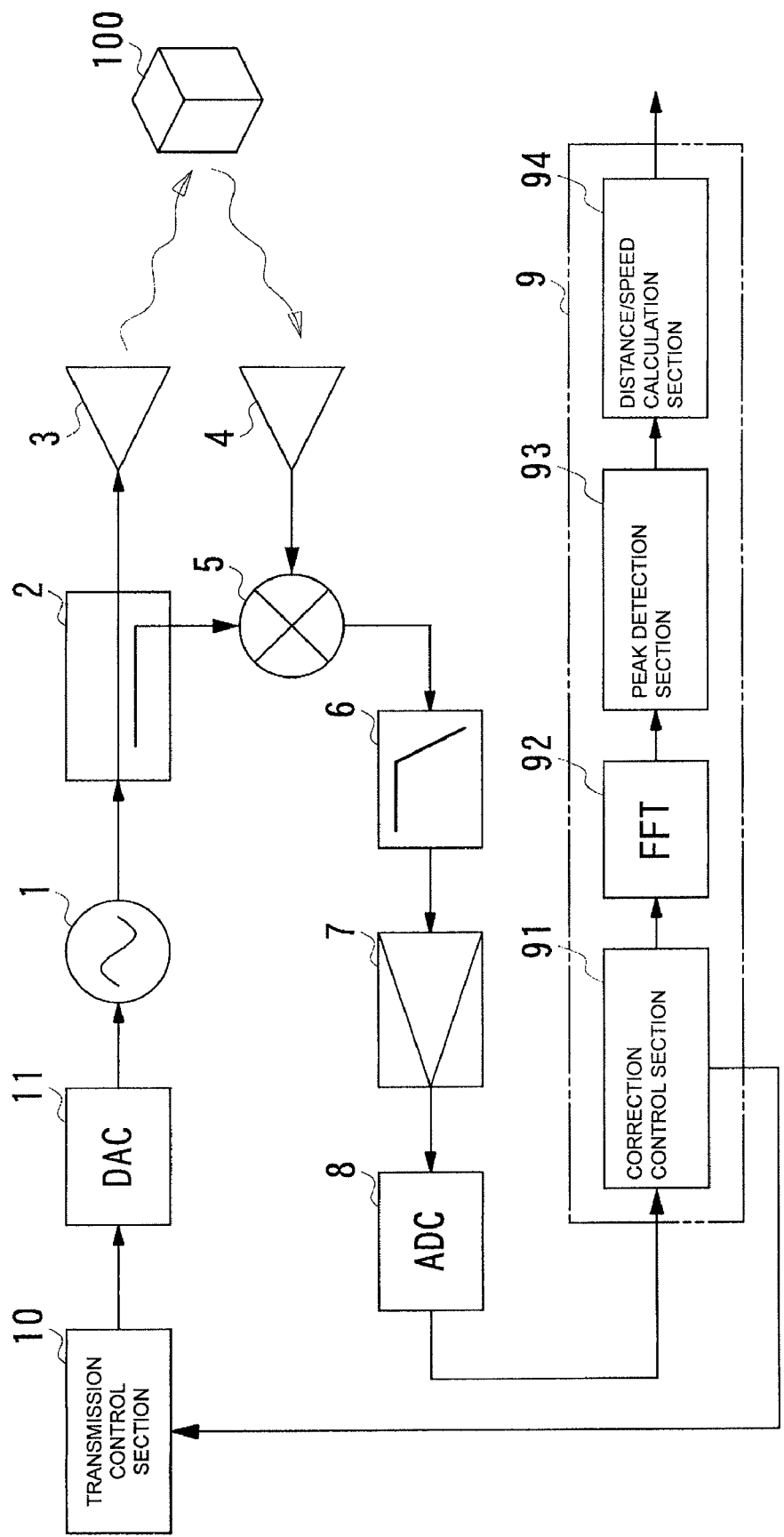
FIG. 1 is a block diagram illustrating a general configuration of an FMCW-type radar apparatus according to a first embodiment.

FIG. 1 is a block diagram illustrating a general configuration of the radar apparatus according to the first embodiment.

Figure 2:
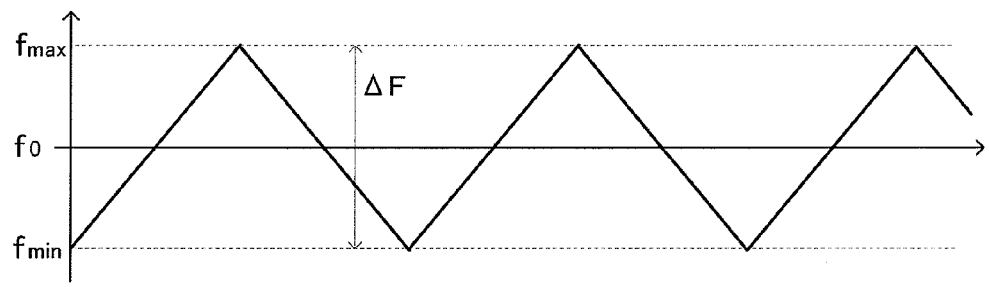
FIG. 2 is a waveform chart of a transmission signal in the radar apparatus according to the first embodiment.

FIG. 2 is a waveform chart of a transmission signal in the radar apparatus according to the first embodiment.

As illustrated in FIG. 1, the radar apparatus according to this embodiment includes a transmission control section 10, a DA converter 11, a VCO (voltage control oscillator) 1, a coupler 2, a transmitting antenna 3, a receiving antenna 4, a mixer 5, an antialiasing filter 6, an IF amplification circuit 7, an AD converter 8, and a signal processing section 9.

The transmission control section 10 generates transmission control data for a transmission signal having a frequency that changes in the form of a triangular wave on the time base, as illustrated in FIG. 2, (hereinafter referred to as a "triangular-wave transmission signal"). More specifically, the term "triangular-wave transmission signal" means a signal that is generated while a frequency changes over time over a modulation frequency band ΔF which is defined by a minimum frequency fmin and a maximum frequency fmax. A zone where the frequency gradually increases from the minimum frequency fmin to the maximum frequency fmax is called an up-modulation zone, and a zone where the frequency gradually decreases from the maximum frequency fmax to the minimum frequency fmin is called a down-modulation zone. The up-modulation zone and the down-modulation zone occur alternately and continuously. On that occasion, it is desired that the frequency changes linearly in both the up-modulation zone and the down-modulation zone. In terms of design, therefore, the frequency is set so as to linearly change.

The transmission control section 10 previously stores, as transmission control data, a control voltage value per sampling time (unit time), which is set such that the frequency changes linearly. Also, the transmission control section 10 has a timer and starts counting upon receiving a control input that indicates the start of transmission. At each predetermined timing, the transmission control section 10 outputs digital data for the control voltage value (i.e., transmission control data).

The D/A converter 11 performs digital-analog conversion of the transmission control data input from the transmission control section 10, thus generating a control voltage signal that is applied to the VCO 1. The VCO 1 generates a transmission signal corresponding to the control voltage signal and outputs the transmission signal to the coupler 2. The coupler 2 transfers the transmission signal from the VCO 1 to the transmitting antenna 3 and also applies, as a local signal, part of the transmission signal to the mixer 5 at a predetermined distribution ratio.

The transmitting antenna 3 is a flat antenna, such as a patch antenna including an electrode pattern formed on a dielectric substrate. The transmitting antenna 3 radiates, to a detection area, transmission electric waves based on the transmission signal with a predetermined transmission directivity. The receiving antenna 4 has, for example, a structure similar to that of the transmitting antenna 3 and receives, with a predetermined reception directivity, reflected electric waves resulting from reflection of the transmitted electric waves by the target 100 that is present within the detection area, thus generating a reception signal. The transmitting antenna 3 and the receiving antenna 4 may be each either a single antenna having a predetermined directivity or an array antenna including a plurality of antenna elements arrayed in a predetermined pattern. As one option, one of the transmitting antenna 3 and the receiving antenna 4 may be a single antenna, and the other may be an array antenna.

The mixer 5 mixes the local signal from the coupler 2 with the reception signal input from the receiving antenna 4, thus generating a beat signal as an intermediate frequency signal, which is output to the antialiasing filter 6. The antialiasing filter 6 is, e.g., a low-pass filter for cutting signals having frequencies of not lower than the Nyquist frequency. In other words, the antialiasing filter 6 allows frequency components of the reception signal, which are lower than an upper limit frequency in the target detectable range, to pass through the filter. The passed frequency components are output to the IF amplification circuit 7. The IF amplification circuit 7 amplifies the beat signal at a predetermined degree of amplification corresponding to a distance. The AD converter 8 successively samples the beat signal per predetermined sampling time for conversion to a sampling data train.

The signal processing section 9 includes a correction control section 91, an FFT processing section 92, a peak detecting section 93, and a distance/speed calculating section 94. The signal processing section 9 is realized with an arithmetic device, such as a DSP. Stated another way, computations executed in those components are realized with arithmetic processing of the DSP. Alternatively, those components may be realized with respective dedicated integrated circuits, for example, instead of the DSP.

The correction control section 91 generates control correction data for the transmission control section 10 by using a later-described method based on an amount of phase change in the beat signal input thereto. The FFT processing section 92 generates a frequency spectrum of the beat signal by using the known FFT process and applies the frequency spectrum to the peak detecting section 93. The peak detecting section 93 detects a peak spectrum and a frequency bin of the peak spectrum from the frequency spectrum input thereto, and then applies them to the distance/speed calculating section 94. The distance/speed calculating section 94 calculates a distance and a speed of the target 100 by using the detected peak spectrum and peak frequency (frequency bin).

Next, transmission control correction in the radar apparatus according to this embodiment will be described in more detail with reference to the drawings. The following description is made for the case where the transmission control correction is performed in a state where the target 100 is installed at a preset reference distance. Also, the following description is made on the assumption that a modulation frequency band width ΔF is set to 300 MHz, the distance to the target 100, i.e., the reference distance, is 5 m, and the number of sampling data per processing group is 1024.

Figure 3:
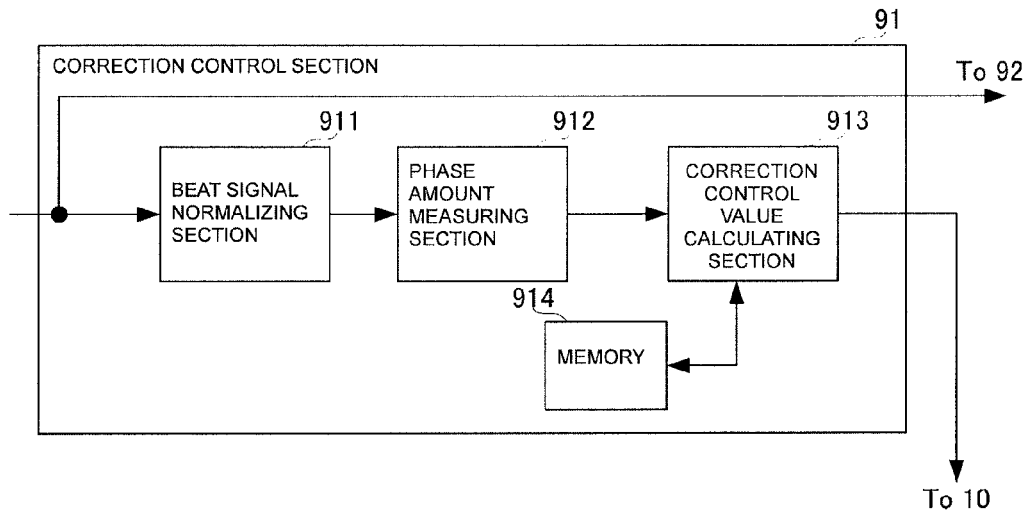
FIG. 3 is a block diagram illustrating a primary configuration of a correction control section 91 in the first embodiment.

FIG. 3 is a block diagram illustrating a primary configuration of the correction control section 91.

Figure 4A:
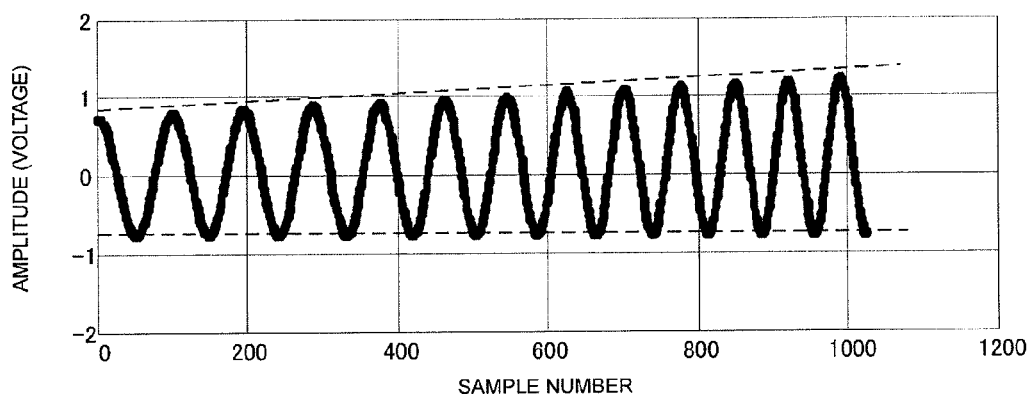
FIG. 4(A) is a waveform chart illustrating the magnitude of a beat signal input to the correction control section 91.
Figure 4B:
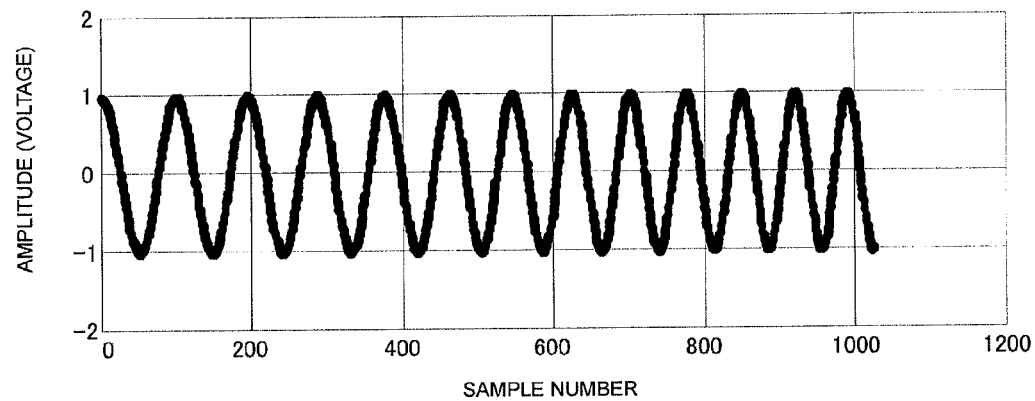
FIG. 4(B) is a waveform chart illustrating the magnitude of the beat signal having been normalized by the correction control section 91.

FIG. 4(A) is a waveform chart illustrating the magnitude of the beat signal input to the correction control section 91, and FIG. 4(B) is a waveform chart illustrating the magnitude of the beat signal having been normalized by the correction control section 91.

Figure 5:
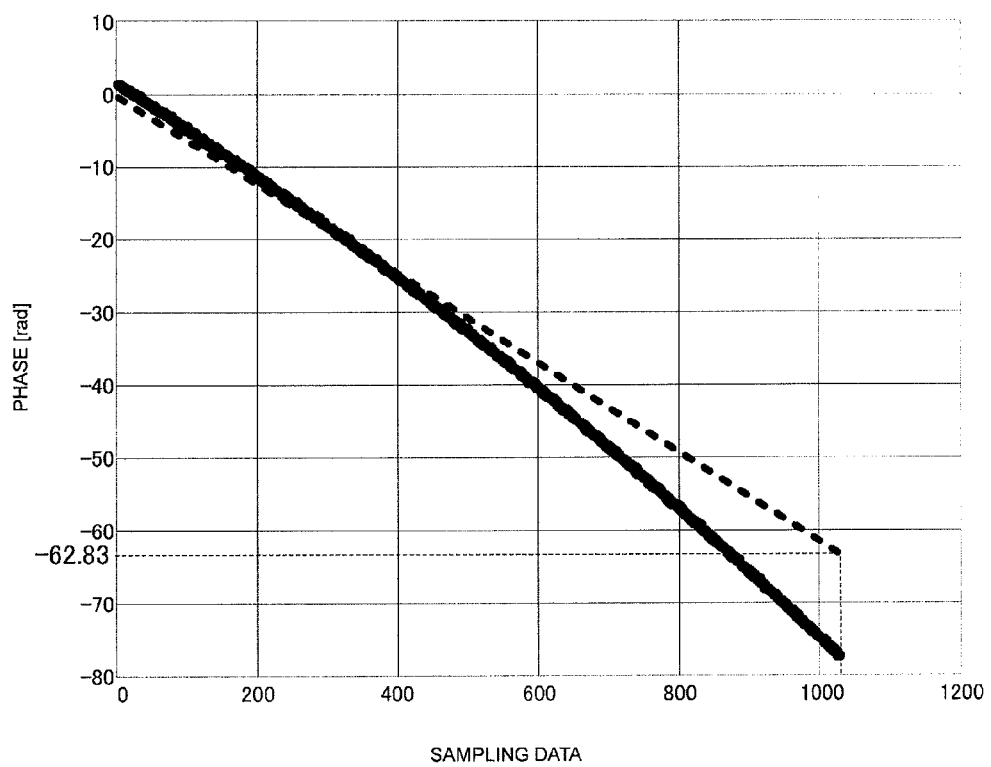
FIG. 5 is a graph illustrating the relationship between sampling data and phase when a group of sampling data are subjected to polygonal approximation.

FIG. 5 is a graph illustrating the relationship between sampling data and phase when a group of sampling data are subjected to polygonal approximation. The calculated phase is based on the result illustrated in FIG. 4(B). Note that a broken line in FIG. 5 represents an ideal amount of phase change.

Figure 6:
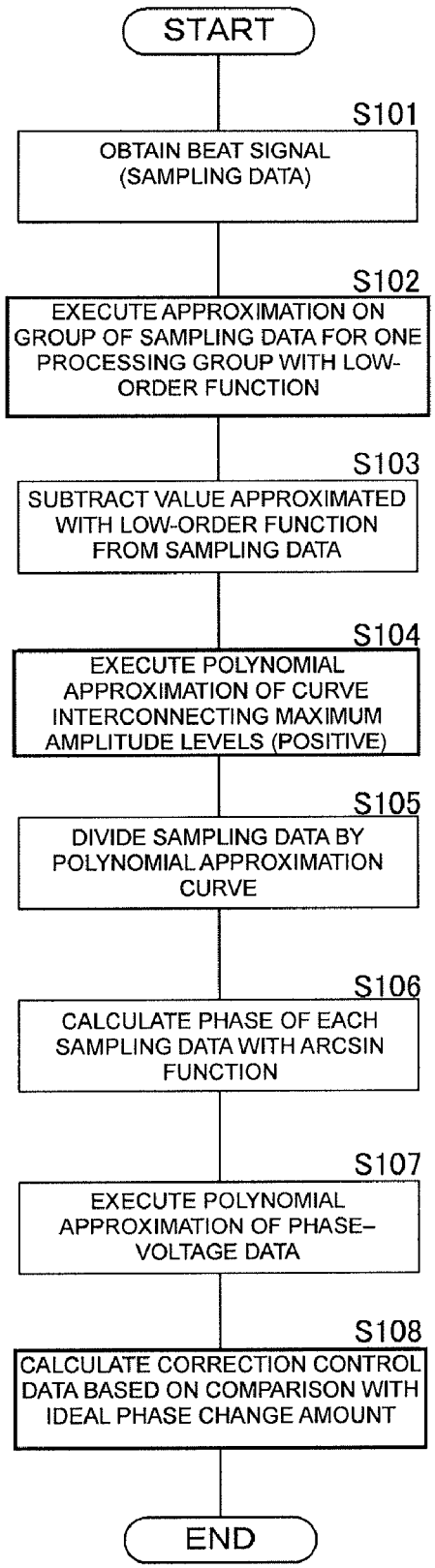
FIG. 6 is a flowchart illustrating a processing flow executed in the correction control section 91 in the first embodiment.

FIG. 6 is a flowchart illustrating a processing flow executed in the correction control section 91.

The correction control section 91 includes a beat signal normalizing section 911, a phase amount measuring section 912, a correction control value calculating section 913, and a memory 914.

The correction control section 91 successively stores, in a buffer memory (not shown), the sampling data of the beat signal, which are input thereto in sequence, in relation to the sampling time (S101). The sampling data of the beat signal are each provided as an amplitude value.

The reference distance and the number of sampling data are previously set in the beat signal normalizing section 911. The beat signal normalizing section 911 obtains, as one processing group, the beat-signal sampling data corresponding to the set number of sampling data. A maximum amplitude level, a minimum amplitude level, and a mid-amplitude level of the waveform defined by the group of sampling data, which have been obtained as one processing group by the beat signal normalizing section 911, vary depending on not only elements attributable to a transmitting/receiving system of the radar apparatus, but also elements attributable to external factors including the target and the observation environment. Therefore, those levels are not constant as illustrated in FIG. 4(B).

The beat signal normalizing section 911 normalizes the sampling data in one processing group such that the maximum amplitude level of the waveform defined by the group of sampling data obtained as one processing group (i.e., the maximum amplitude level thereof in the positive direction) becomes "+1", the minimum amplitude level of the waveform (i.e., the maximum amplitude level thereof in the negative direction) becomes "−1", and the mid-amplitude level of the waveform becomes "0".

To describe a normalization process in more detail, the beat signal normalizing section 911 approximates the group of sampling data in one processing group with a low-order function (S102). Then, the beat signal normalizing section 911 subtracts a low-order function value from each corresponding sampling data (S103). Next, the beat signal normalizing section 911 obtains a curve interconnecting respective maximum amplitude levels, which are provided by the group of sampling data in one processing group, with polynomial approximation (S104). Further, the beat signal normalizing section 911 divides the sampling data by a value which has been obtained with the polynomial approximation and which corresponds to each sampling data (S105).

As a result of the normalization process, the waveform defined by the group of sampling data in one processing group is provided as illustrated in FIG. 4(B). The beat signal normalizing section 911 applies the sampling data in one processing group, which have been normalized as described above, to the phase amount measuring section 912.

The phase amount measuring section 912 (corresponding to "actually-measured phase change amount calculating means") calculates an arcsin function of the amplitude level of each sampling data applied thereto (S106). It is here assumed that, in an amplitude increasing zone of the beat signal, the minimum amplitude level "−1" is at a phase of "−π/2(+3π/2)", the amplitude level "0" is at a phase of "0", and the maximum amplitude level "+1" is at a phase of "+π/2". On the other hand, it is assumed that, in an amplitude decreasing zone of the beat signal, the maximum amplitude level "+1" is at a phase of "+π/2", the amplitude level "0" is at a phase of "+π", and the minimum amplitude level "−1" is at a phase of "+3π/2".

Accordingly, if the sampling time indicates that the relevant sampling data belongs to the amplitude increasing zone of the beat signal, the phase amount measuring section 912 provides, as a phase, the result of calculating the amplitude level with arcsin used as an operator. Also, if the sampling time indicates that the relevant sampling data belongs to the amplitude decreasing zone of the beat signal, the phase amount measuring section 912 provides, as a phase, a value obtained by calculating the amplitude level with arcsin used as an operator and subtracting the calculated result from 2π.

The phase amount measuring section 912 arranges the thus-obtained phases in the order of the sampling data to perform conversion such that the phases increase or decrease monotonously. The phase amount measuring section 912 applies the thus-obtained sampling data to the correction control value calculating section 913.

Upon obtaining the respective phases of the sampling data, the correction control value calculating section 913 reads out voltage data that is provided as the transmission control data at the time of the transmission, which corresponds to each sampling data. Then, the correction control value calculating section 913 replaces the sampling data by the read-out voltage data and correlates the voltage data with each phase. Further, the correction control value calculating section 913 executes polynomial approximation on the relationship between the phase and the voltage data (S107).

The correction control value calculating section 913 compares the phase corresponding to each sampling data (each voltage data) with a proper ideal phase value based on the obtained-phase versus voltage-data curve, and calculates the correction control data (S108). More specifically, with the measurement result in this embodiment, the actually measured phase indicates that, as illustrated in FIG. 5, a total phase change amount for the number 1024 of sampling data is about 77 rad. In other words, an actually-measured total phase change amount is about 77 rad. However, when the distance to the target 100, i.e., the reference distance, is 5 m and the modulation frequency band width ΔF is 300 MHz, an ideal total phase change amount is provided by:

$$2\pi \times 5/0.5 = 62.83 \text{ rad}$$

Accordingly, the actually-measured total phase change amount and the ideal phase change amount differ from each other. Further, because the number of sampling data is 1024, an amount of phase change occurring during one interval between successive sampling timings is provided by:

$$62.83/(1024-1) = 0.0614 \text{ rad}$$

In other words, when the phase of the transmission signal is changed along an ideal linear line, the phase has to be changed in units of 0.0614 rad per sampling timing.

The ideal total phase change amount and an ideal unit phase change amount at each sampling timing (voltage data) are stored in the memory 914. Upon obtaining the group of sampling data in one processing group, the correction control value calculating section 913 reads out both the ideal total phase change amount and the ideal unit phase change amount from the memory 914.

At each of the sampling timings, the correction control value calculating section 913 compares the actually measured phase amount (i.e., the phase amount having been converted in monotonously decreasing order) with the ideal phase change amount and calculates correction phase data to compensate for a difference between them. Stated another way, the correction control value calculating section 913 calculates, at each of the sampling timings (for each voltage data), the correction phase data for making a function line indicated by a solid line, illustrated in FIG. 5, aligned with a function line indicated by a broken line. Further, the correction control value calculating section 913 calculates correction control data that is provided as voltage data for realizing the calculated correction phase data, and then outputs the correction control data to the transmission control section 10.

Upon obtaining the correction control data, the transmission control section 10 generates transmission control data based on the correction control data.

With the above-described configuration and processing, a modulation characteristic of the voltage control oscillator can be corrected without using a millimeter-wave measuring device that is expensive and is difficult to handle. Further, the correction can be performed by using a comparatively short distance, e.g., 5 m. Therefore, even if the modulation characteristic of the voltage control oscillator is changed due to some influence, such as changes over time, it can be easily corrected in an ordinary maintenance factory without needing a special maintenance factory adapted for the correction.

Also, with the above-described configuration and processing, the voltage control oscillator can be corrected with simpler arithmetic processing than that required in the related art so that it can accurately generate an ideal transmission signal of which frequency changes linearly. As a result, the distance and the speed of the target can be detected with high accuracy.

Further, since a phase deviation can be evaluated at each of the sampling times over the entire beat signal, the correction can be executed with higher accuracy than the method using a split FFT-based process, etc.

The first embodiment has been described in connection with the correction process using the group of sampling data in one processing group. However, the above-described arithmetic processing can also be executed by buffering a plurality of processing groups and calculating an average value of plural sampling data corresponding to each other.

Figure 7:
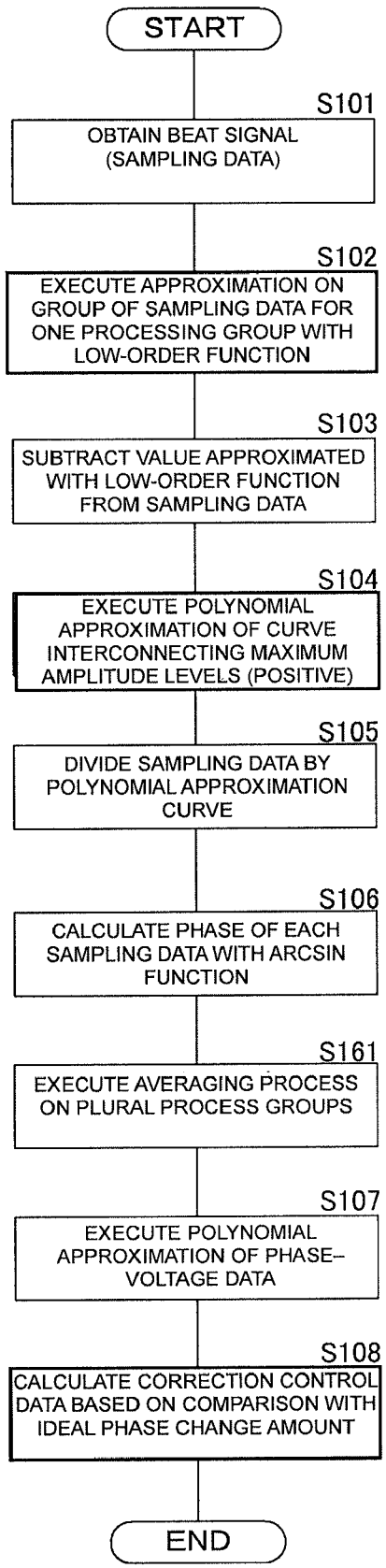
FIG. 7 is a flowchart illustrating a processing flow executed in the correction control section 91 when an averaging process is executed.

In such a case, an averaging step, illustrated in FIG. 7, needs to be just inserted between S105 and S106 in the flowchart of FIG. 6.

FIG. 7 is a flowchart illustrating a processing flow executed in the correction control section 91 when the averaging process is executed.

More specifically, the beat signal normalizing section 911 buffers the normalized sampling data in a plurality of processing groups, executes the averaging process on the buffered sampling data in the plurality of processing groups, and applies a resulting average value to the phase measuring section 912 (S161).

The execution of the averaging process is effective in suppressing the influence of noise that may abruptly occur at the time when the sampling data is obtained. As a result, the transmission signal can be corrected with higher accuracy, and hence the distance and the speed of the target can be detected with higher accuracy.

A radar apparatus according to a second embodiment will be described below with reference to the drawings.

Figure 8:
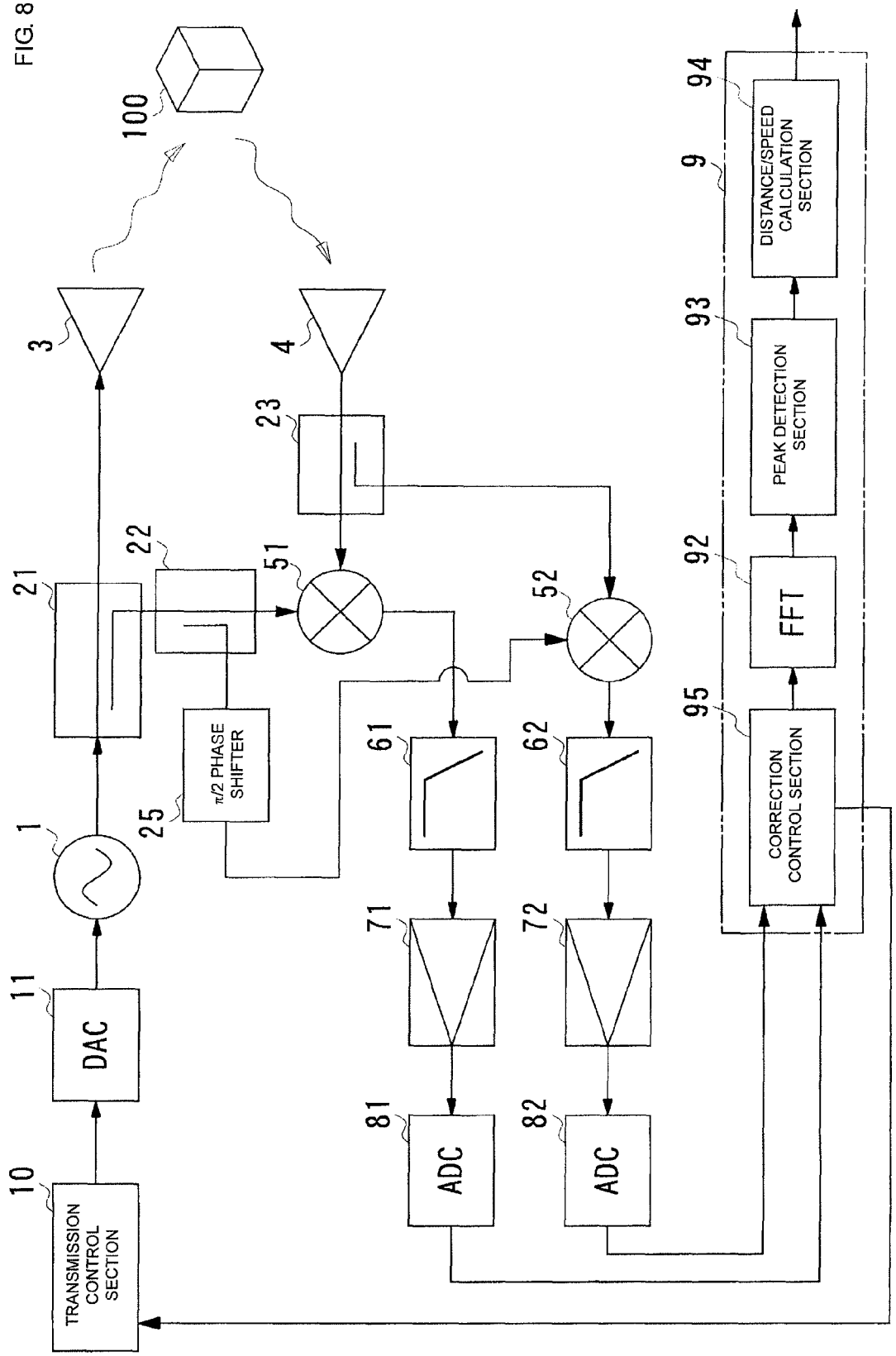
FIG. 8 is a block diagram illustrating a primary configuration of a radar apparatus according to a second embodiment.

FIG. 8 is a block diagram illustrating a primary configuration of the radar apparatus according to the second embodiment.

Figure 9:
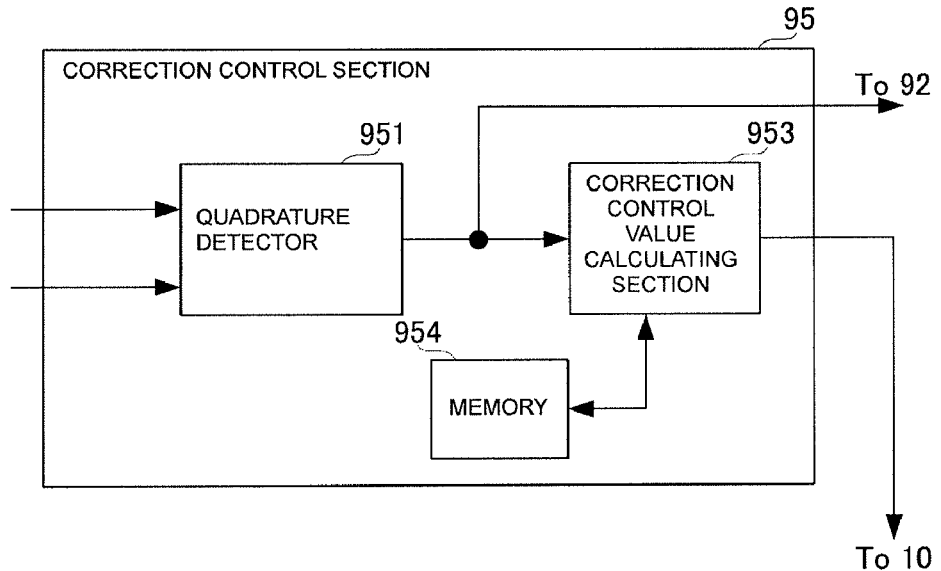
FIG. 9 is a block diagram illustrating a primary configuration of a correction control section 95 in the second embodiment.

FIG. 9 is a block diagram illustrating a primary configuration of a correction control section 95 in the second embodiment.

Figure 10:
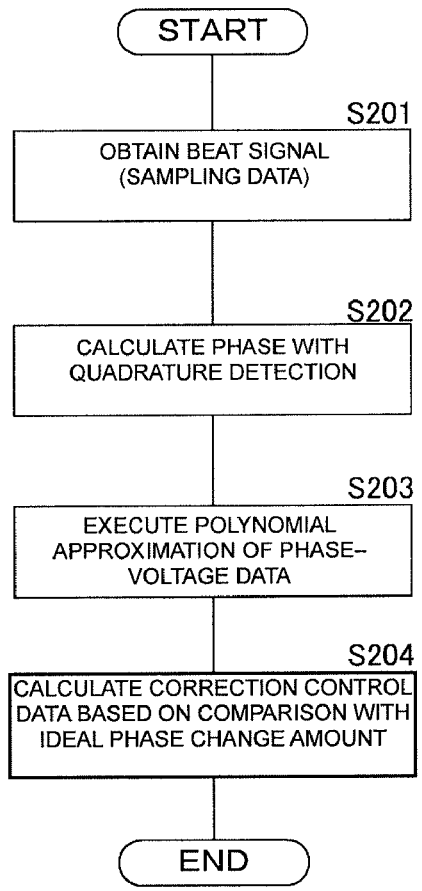
FIG. 10 is a flowchart illustrating a processing flow executed in the correction control section 95 in the second embodiment.

FIG. 10 is a flowchart illustrating a processing flow executed in the correction control section 95 in the second embodiment.

The radar apparatus according to the second embodiment includes a coupler 22 between a coupler 21 corresponding to the coupler 2 in the first embodiment and a mixer 51 corresponding to the mixer 5 in the first embodiment. Further, the radar apparatus according to the second embodiment includes a coupler 23 between the receiving antenna 4 and the mixer 51. A π/2 phase shifter 25 is connected to a branch signal output terminal of the coupler 22. A mixer 52 is connected to a branch signal output terminal of the coupler 23, and the π/2 phase shifter 25 is also connected to the mixer 52.

An output terminal of the mixer 51 is connected to an antialiasing filter 61. The antialiasing filter 61 is connected to an IF amplification circuit 71, and the IF amplification circuit 71 is connected to an AD converter 81.

An output terminal of the mixer 52 is connected to an antialiasing filter 62. The antialiasing filter 62 is connected to an IF amplification circuit 72, and the IF amplification circuit 72 is connected to an AD converter 82.

The AD converter 81 and AD converter 82 are connected to the correction control section 95.

The coupler 21 transfers the transmission signal from the VCO 1 to the transmitting antenna 3 and also applies, as a local signal, part of the transmission signal to the coupler 22 at a predetermined distribution ratio. The coupler 22 divides the local signal at a ratio providing signals of the same level and applies the branched local signals to the mixer 51 and the π/2 phase shifter 25. The π/2 phase shifter 25 shifts and rotates the phase of the branched local signal input thereto by π/2, and then applies the phase-shifted signal to the mixer 52.

The coupler 23 divides the reception signal at a ratio providing signals of the same level and applies the branched reception signals to the mixers 51 and 52.

The mixer 51 mixes the branched reception signal from the coupler 23 and the branched local signal from the coupler 22 with each other, thus generating an in-phase beat signal. The antialiasing filter 61, the IF amplification circuit 71, and the AD converter 81 execute signal processing in similar manners respectively to the antialiasing filter 6, the IF amplification circuit 7, and the AD converter 8, which are described in the first embodiment. Thereafter, the in-phase beat signal obtained in the form of sampling data is applied to the correction control section 95.

The mixer 52 mixes the branched reception signal from the coupler 23 and the branched local signal of opposite phase from the π/2 phase shifter 25 with each other, thus generating a quadrature beat signal. The antialiasing filter 62, the IF amplification circuit 72, and the AD converter 82 execute signal processing in similar manners respectively to the antialiasing filter 6, the IF amplification circuit 7, and the AD converter 8, which are described in the first embodiment. Thereafter, the quadrature-phase beat signal obtained in the form of sampling data is applied to the correction control section 95.

The correction control section 95 includes a quadrature detector 951, a correction control value calculating section 953, and a memory 954. The quadrature detector 951 obtains the in-phase beat signal and the quadrature-phase beat signal both input thereto (S201). The quadrature detector 951 executes quadrature detection based on the in-phase beat signal and the quadrature-phase beat signal corresponding to each other, thus calculating the phase of each sampling data. Further, the quadrature detector 951 arranges the thus-obtained phases in the order of the sampling data to perform conversion such that the phases increase or decrease monotonously. The quadrature detector 951 applies the thus-obtained sampling data to the correction control value calculating section 953 (S202). The correction control section 95 applies the beat signal in the form of a complex number, including the in-phase beat signal as a real part and the quadrature-phase beat signal as an imaginary part, to the FFT processing section 92 for calculation of the distance and the speed.

The correction control value calculating section 953 executes signal processing in a similar manner to the correction control value calculating section 913 described in the first embodiment, thus calculating correction control data that is applied to the transmission control section 10 (S203 and S204).

The above-described configuration using the quadrature detector can also provide similar advantages to those obtained with the first embodiment.

Further, with the configuration and processing of the second embodiment, a simpler signal processing system can be realized because of no need of the process for normalizing the beat signal. While, in the first embodiment, a phase error tends to increase at the phase in the vicinity of nπ (n: integer), the phase can be detected in the second embodiment with high accuracy regardless of the phase position.

Additionally, the second embodiment can also be modified, as in the above-described first embodiment, such that an average value calculating process is executed on the sampling data in plural processing groups.

A radar apparatus according to a third embodiment will be described below with reference to the drawings.

FIGS. 11(A) and 11(B) are block diagrams illustrating a primary configuration of the radar apparatus according to the third embodiment.

Figure 12:
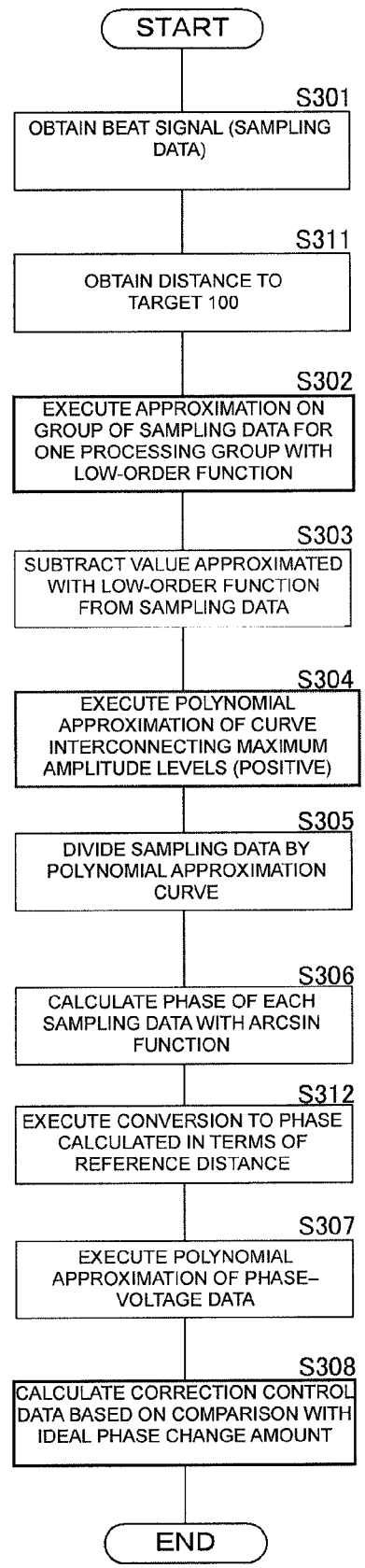
FIG. 12 is a flowchart illustrating a processing flow executed in a correction control section 91 in the third embodiment.

FIG. 12 is a flowchart illustrating a processing flow executed in a correction control section 91 in the third embodiment.

The radar apparatus according to the third embodiment has the same configuration as the radar apparatus according to the first embodiment except that the former differs only in configuration of the signal processing section 9 from the latter.

In the radar apparatus according to the third embodiment, the distance to the target 100, which has been calculated by the distance/speed calculating section 94, is applied to the correction control section 91. The distance applied to the correction control section 91 is also applied to the correction control value calculating section 913.

The third embodiment is described in connection with a configuration and a processing method adapted for the case of not only executing the correction by using the target previously arranged at the reference position as described above, but also executing the correction even for a moving target, i.e., a target under detection.

With the processing method of the third embodiment, a group of sampling data of the beat signal is obtained by the beat signal normalizing section 911 (S101), and the distance calculated by the distance/speed calculating section 94 based on frequency is applied to the correction control value calculating section 913 (S311).

The beat signal normalizing section 911 and the phase amount measuring section 912 in the correction control section 91 calculate the phase of each sampling data (S302 to S306) by executing signal processing similar to that in S102 to S106 illustrated in FIG. 6.

The correction control value calculating section 913 multiplies the calculated phase of each sampling time by a value resulting from dividing the preset reference distance by the detected distance (S312). The phase is thereby converted to a phase that appears when the detected target 100 is positioned at the reference distance.

The correction control value calculating section 913 executes signal processing similar to that in S107 and S108, illustrated in FIG. 6, by using the phase which has been converted to a value corresponding to the reference distance, thus calculating the correction control data (S307→S308).

With the processing described above, even when the target is not installed at the preset reference position, the voltage control oscillator can be corrected with simpler processing and high accuracy. Further, the correction of the voltage control oscillator can be performed whenever necessary even during a period in which the radar apparatus is actually used. Accordingly, because of no necessity of obtaining temperature correction data in a production stage, a reduction of the production cost and an improvement of productivity can be realized. Further, an adverse effect caused by changes over time can also be prevented.

Additionally, the processing executed in the third embodiment can also be applied to the configuration and the processing in the second embodiment. The processing in the third embodiment can also include, as in the above-described first embodiment, an average value calculating process that is executed on the sampling data in plural processing groups.

A radar apparatus according to a fourth embodiment will be described below with reference to the drawings.

Figures 13A, 13B:
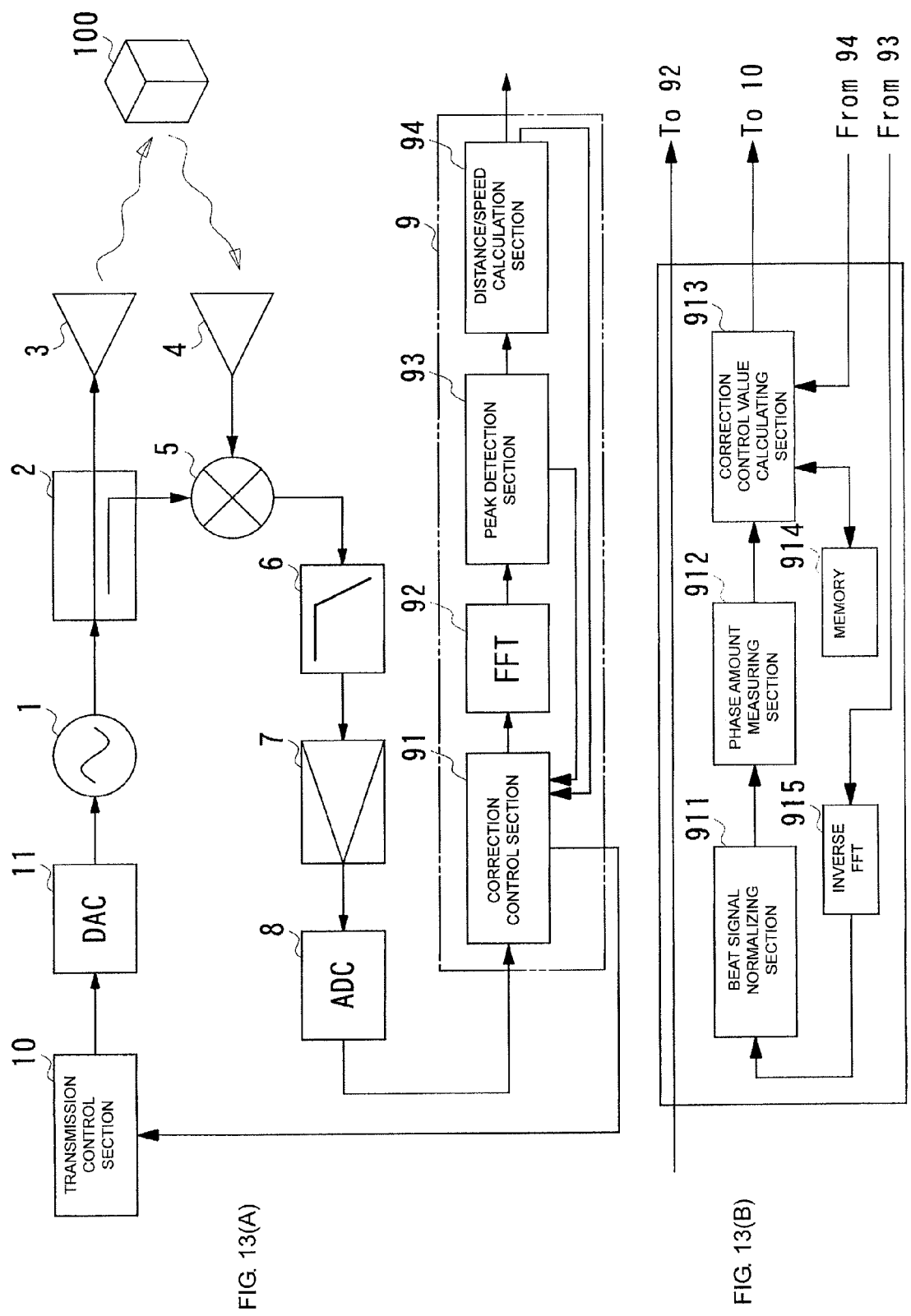
FIGS. 13(A) and 13(B) are block diagrams illustrating a primary configuration of a radar apparatus according to a fourth embodiment.

FIGS. 13(A) and 13(B) are block diagrams illustrating a primary configuration of the radar apparatus according to the fourth embodiment.

Figure 14:
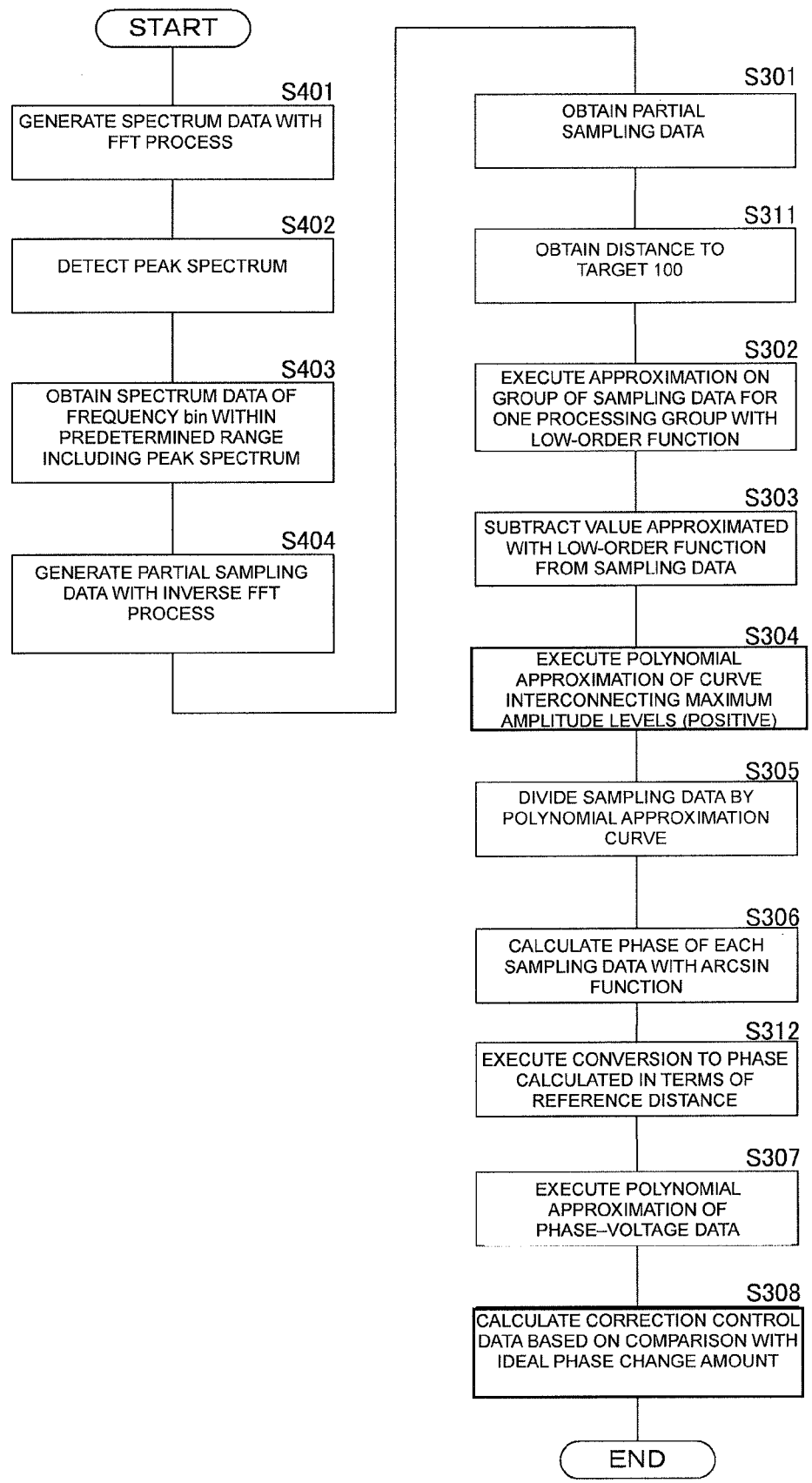
FIG. 14 is a flowchart illustrating a processing flow executed in a correction control section 91 in the fourth embodiment.

FIG. 14 is a flowchart illustrating a processing flow executed in a correction control section 91 in the fourth embodiment.

The radar apparatus according to the fourth embodiment has the same configuration as the radar apparatus according to the third embodiment except that the former differs only in configuration of the signal processing section 9 from the latter.

The sampling data of the beat signal input to the signal processing section 9 is applied to the FFT processing section 92 without being particularly processed in the correction control section 91. The FFT processing section 92 generates frequency spectrum data of the beat signal by using the known FFT process and applies the generated frequency spectrum data to the peak detection section 93 (S401). The peak detecting section 93 obtains a peak spectrum and a frequency bin of the peak spectrum from the frequency spectrum input thereto (S402), and then applies them to the distance/speed calculating section 94. Further, the peak detecting section 93 extracts, for the detected frequency bin of the peak spectrum, frequency spectrum data in a predetermined frequency band width including the frequency bin together with frequencies on both sides thereof, and then applies the extracted frequency spectrum data to an inverse FFT processing section 915 in the correction control section 91 (S403). The inverse FFT processing section 915 in the correction control section 91 executes an inverse FFT process on the partial frequency spectrum data input thereto, thus generating partial sampling data corresponding to a predetermined range including the peak spectrum (S404). Further, the inverse FFT processing section 915 applies the generated partial sampling data to the beat signal normalizing section 911.

The distance/speed calculating section 94 calculates the distance and the speed of the target 100 based on the detected peak spectrum and the peak frequency (i.e., the frequency bin). The calculated distance is applied to the correction control value calculating section 913 in the correction control section 91.

The beat signal normalizing section 911, the phase amount measuring section 912, and the correction control value calculating section 913 calculate, by using the partial sampling data and the detected distance, the correction control data (S401 to S408 (including S411 and S412)) by executing signal processing similar to that in S301 to S308 (including S311 and S312) described in the third embodiment.

With the above-described configuration and processing, a group of sampling data corresponding to the detected target can be obtained. Therefore, even when there are a plurality of targets, a group of sampling data can be reliably obtained for each of the targets. As a result, the voltage control oscillator can be reliably corrected. Further, since the correction control data can be calculated for each target when there are a plurality of targets, the correction control data less affected by noise can be obtained, for example, by executing an average value calculating process on plural lots of the calculated correction control data. Accordingly, the voltage control oscillator can be corrected with higher accuracy.

The invention claimed is:

1. A radar apparatus comprising:
a transmitter that changes a frequency over time in a predetermined frequency band width to generate a transmission signal and transmits the transmission signal;
a receiver that receives a reflected signal resulting from the transmission signal and generates a reception signal;
target detector that detects a target based on a beat signal obtained from the reception signal and the transmission signal;
a beat signal normalizing section that holds an amplitude of the beat signal constant and removes an offset component;
an actually-measured phase change amount calculating section that calculates an actually measured amount of phase change of the normalized beat signal per unit time; and
a correction control value calculating section that calculates a correction control value per unit time, which makes the actually measured amount of phase change matched with a preset amount of phase change per unit time,
the transmitter generating the transmission signal while correcting the transmission signal based on the correction control value.

2. The radar apparatus according to claim 1, wherein the actually-measured phase change amount calculating section uses an average value of the actually-measured phase change amounts, which are obtained from plural lots of beat signals resulting from reflection of the transmission signal by the target at a particular unit distance.

3. The radar apparatus according claim 1, wherein the actually-measured phase change amount calculating section comprises:
a peak spectrum detecting section that executes a Fourier transform process on the beat signal and detects a peak spectrum; and
a partial beat signal obtaining section that executes an inverse transform process on spectrum data within a predetermined frequency range including the detected peak spectrum and obtains a beat signal component corresponding to the predetermined frequency range,
the actually measured amount of phase change being calculated based on the obtained beat signal component.

4. The radar apparatus according to claim 1, further comprising an ideal phase change amount calculating section that calculates an ideal amount of phase change per unit time based on a total amount of phase change derived from both a distance to the target and the predetermined frequency band width,
wherein the correction control value calculating section calculates the correction control value per unit time such that the actually measured amount of phase change matches with the ideal amount of phase change.

5. The radar apparatus according to claim 1, further comprising a normalized ideal phase-change amount calculating section that calculates a normalized ideal amount of phase change per unit time for a preset reference distance based on a total amount of phase change derived from both a distance to the target and the predetermined frequency band width,
wherein the correction control value calculating section calculates the correction control value per unit time such that the actually measured amount of phase change matches with the normalized ideal amount of phase change.

* * * * *

UNITED STATES PATENT AND TRADEMARK OFFICE
CERTIFICATE OF CORRECTION

PATENT NO. : 7,834,804 B2 Page 1 of 1
APPLICATION NO. : 12/469928
DATED : November 16, 2010
INVENTOR(S) : Motoi Nakanishi It is certified that error appears in the above-identified patent and that said Letters Patent is hereby corrected as shown below:

On the title page, change item [30]

--(30)   Foreign Application Priority Data

Dec. 11, 2006   (JP)   ..........................2006-332980--.

Signed and Sealed this
Twenty-second Day of March, 2011

David J. Kappos
*Director of the United States Patent and Trademark Office*